(12) United States Patent
Jäger

(10) Patent No.: US 6,722,836 B2
(45) Date of Patent: Apr. 20, 2004

(54) LINKED MANUFACTURING SYSTEM FOR PROCESSING PARTS

(75) Inventor: Helmut F. Jäger, Königsbach-Stein (DE)

(73) Assignee: Felsomat GmbH & Co. KG, Konigsbach-Stein (DE)

( * ) Notice: Subject to any disclaimer, the term of this patent is extended or adjusted under 35 U.S.C. 154(b) by 0 days.

(21) Appl. No.: 10/095,675

(22) Filed: Mar. 12, 2002

(65) Prior Publication Data

US 2002/0148704 A1 Oct. 17, 2002

(30) Foreign Application Priority Data

Mar. 12, 2001 (DE) .......................... 101 12 169

(51) Int. Cl.⁷ .............................. B65H 3/00
(52) U.S. Cl. .................. 414/222.01; 198/358; 901/8
(58) Field of Search ................ 414/222.01, 591; 901/8; 212/333, 334; 198/358, 468.2, 574

(56) References Cited

U.S. PATENT DOCUMENTS

| | | | |
|---|---|---|---|
| 4,053,741 A | * 10/1977 | Ainoya et al. | 198/358 X |
| 4,251,957 A | * 2/1981 | Terahara | 901/8 X |
| 4,373,624 A | * 2/1983 | Molins et al. | 198/358 X |
| 4,711,016 A | 12/1987 | Genschow et al. | |
| 4,761,112 A | * 8/1988 | Hammon et al. | 414/591 |
| 5,078,257 A | 1/1992 | Carter, Jr. | |
| 5,368,539 A | 11/1994 | Mills et al. | |
| 5,997,452 A | 12/1999 | Assie | |
| 6,325,591 B1 | * 12/2001 | Focke et al. | 414/749.1 |

FOREIGN PATENT DOCUMENTS

| | | |
|---|---|---|
| DE | 32 43 335 A1 | 5/1984 |
| DE | 41 16 283 A1 | 1/1992 |
| EP | 0 924 584 A2 | 6/1999 |

* cited by examiner

*Primary Examiner*—Donald W. Underwood
(74) *Attorney, Agent, or Firm*—Harness, Dickey & Pierce, P.L.C.

(57) ABSTRACT

A linked manufacturing system for processing parts is disclosed having at least a first processing station for performing a first processing operation, and having a second processing station for performing a second processing operation. At least a first gantry extends in a first direction for linking at least a first and a second processing station. Also at least a second gantry is provided extending transversely to the first direction in a second direction for linking a plurality of first and second processing stations. Each second gantry is coupled to a storage device for receiving parts, wherein slides are displaceable along each second gantry that have a gripper displaceable at least in vertical direction and allowing at least an additional handling operation, while slides are displaceable along the first gantries that are coupled with a gripper for picking up or placing parts and for moving parts along the first gantries.

24 Claims, 3 Drawing Sheets

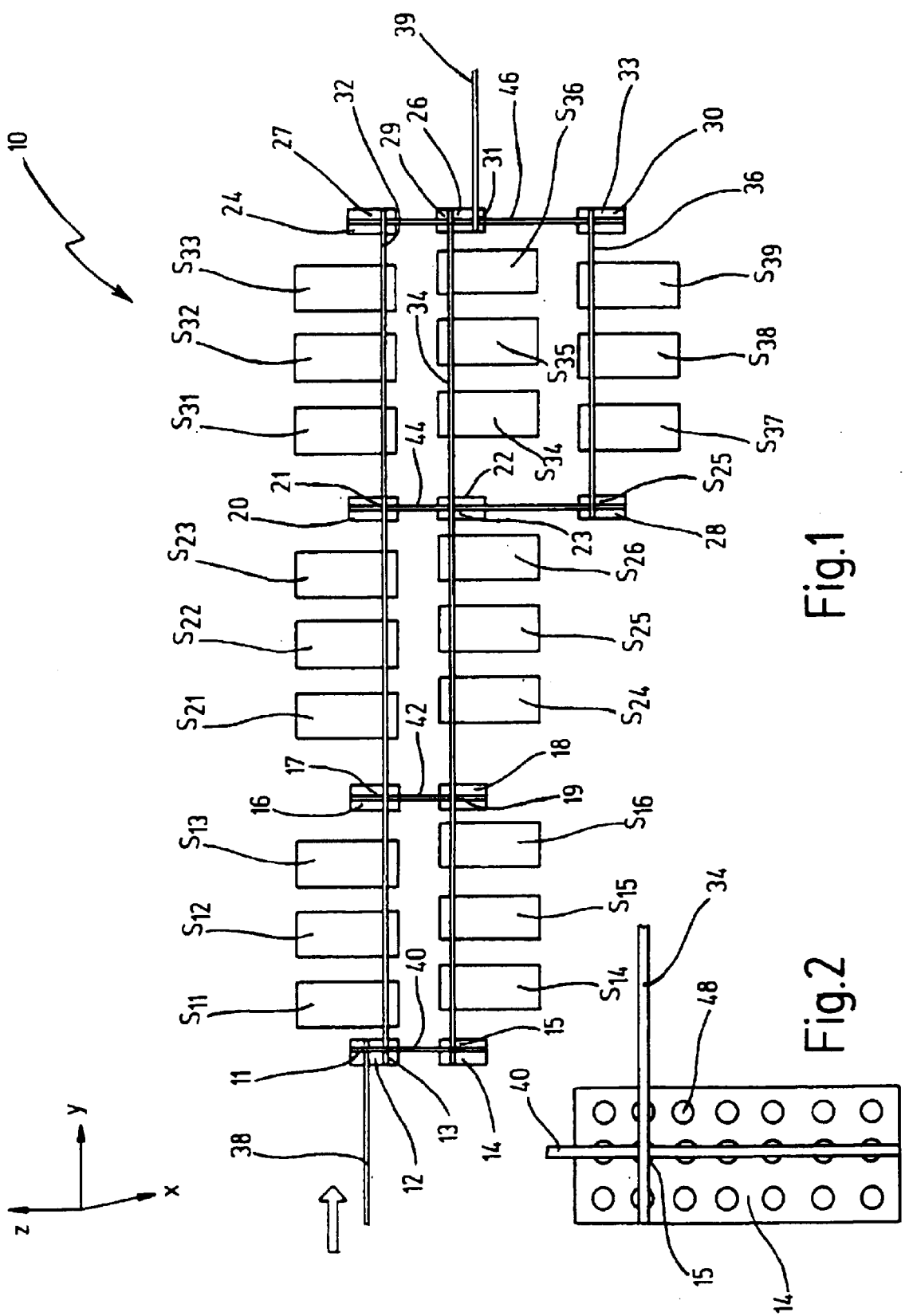

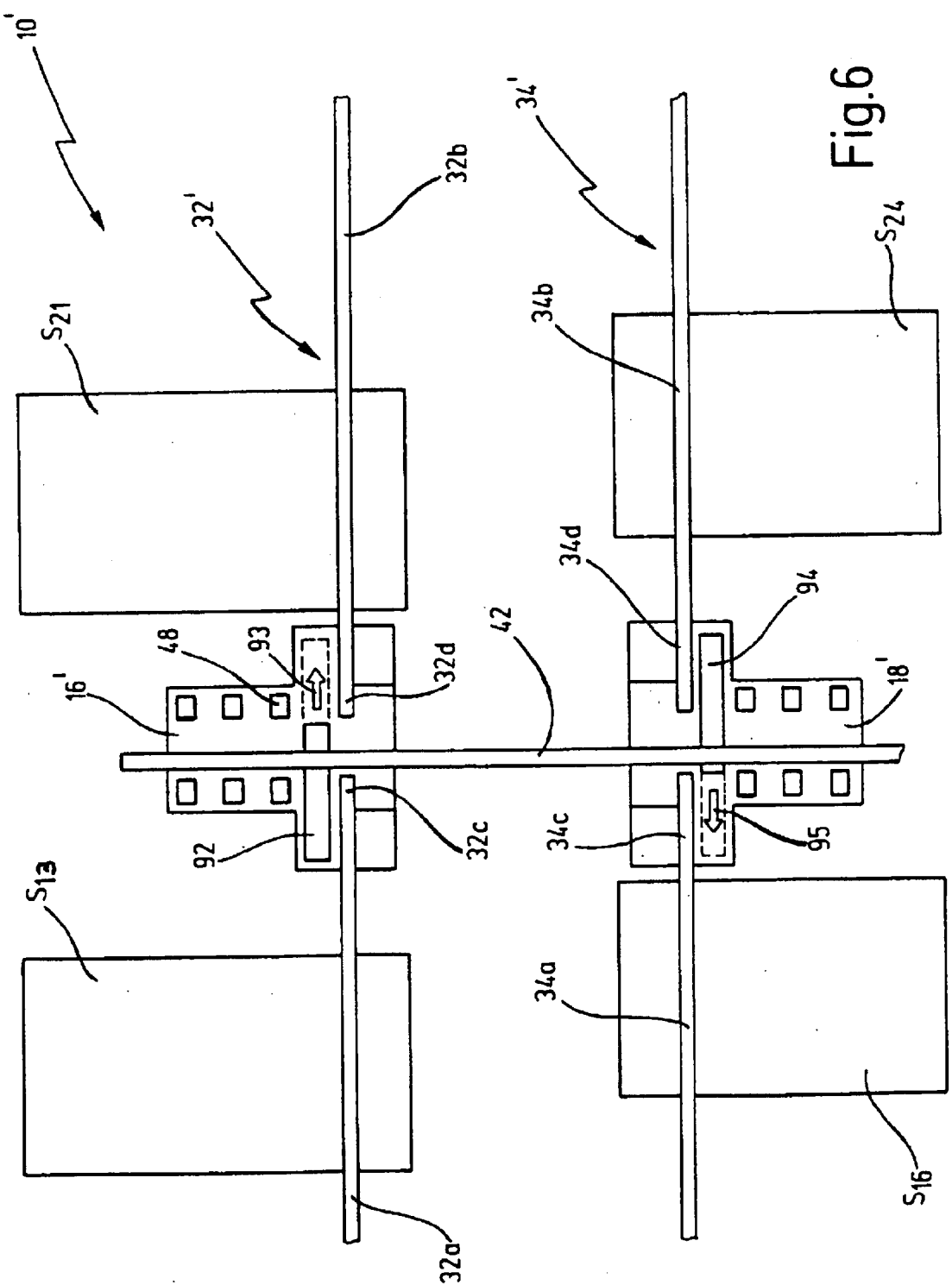

LINKED MANUFACTURING SYSTEM FOR PROCESSING PARTS

BACKGROUND OF THE INVENTION

The invention is directed to a linked manufacturing system for processing parts, comprising at least a first processing station for performing a first processing operation, at least a second processing station for performing a second processing operation and further comprising at least a gantry for linking two of the processing stations.

Linked manufacturing systems are utilized in series production to allow reliable and cost-effective processing within a plurality of processing stations. Typical applications for linked manufacturing systems can for instance be found in the car industry, for instance for providing a highly efficient motor and gear parts manufacturing.

As a classic example for a linked manufacturing system the line production is known, wherein the parts flow between individual processing stations is controlled via a conveyor belt which is also utilized as a buffer. From the conveyor belt gantries depart sideways toward individual processing stations.

As a further example for a linked manufacturing system the coupling of a plurality of processing stations via gantries is known, wherein between single or several processing stations belt-buffers are provided for decoupling. Such belt-buffers are configured as transport conveyor belts which may transport individual parts or may buffer same. Such buffers usually can receive 10 to 20 parts and may absorb some variations which are caused by delays at the respective processing stations linked therewith.

However, a drawback is given by the fact that the belt-buffers are only designed for a small number of parts so that in case of larger disruptions at a single or several processing stations of the manufacturing system the whole system comes to a halt very soon. It is also detrimental in the case of breakdown of a conveyor belt or in the case of a transport jamming on a conveyor belt, that there is no substitute transport capacity, whereby the availability of the total system is impaired. Finally, the utilization of conveyor belts is expensive and does not allow a direct transport of individual parts. Also the accessibility of individual processing stations is effected adversely thereby.

From U.S. Pat. No. 5,078,257, a lattice production line is known that includes a plurality of workstations, each connected to adjacent workstations by more than two conveyor belts. Each workstation includes a manufacturing robot, an outer turntable with workpiece storage, and an inner turntable aligned with the robot.

Although, such a system is very flexible, it suffers from the principal drawbacks of the conveyer belts, as outlined before.

SUMMARY OF THE INVENTION

It is a first object of the invention to provide an improved linked manufacturing system for processing parts that allows a fast transportation of parts between the respective processing stations.

It is a second object of the invention to provide a linked manufacturing system that provides for a high availability and safety against breakdown.

It is a third object of the invention to provide a manufacturing system that allows short throughput times for the total system at low cost.

It is another object of the invention to provide an improved linked manufacturing system of a space-saving design.

It is still another object of the invention to disclose an improved linked manufacturing system comprising a gantry of extremely simple and cost-saving design allowing particularly fast transportation of parts.

These and other objects of the invention are achieved by a linked manufacturing system for processing parts, comprising at least a first processing station for performing a first processing operation, at least a second processing station for performing a second processing operation, further comprising at least a first gantry (logistics gantry) extending in a first direction (Y-direction) and coupling at least a first and a second processing station, further comprising at least a second gantry (handling gantry) extending transversely to the first direction and a second direction (X-direction) and coupling a plurality of first or second processing stations, wherein a storage device for receiving parts is assigned to at least each handling gantry, wherein slides are displaceable on the handling gantries, the slides comprising at least a gripping device displaceable at least in vertical direction (Z-direction) and allowing at least one additional handling operation, such as displacing in Y-direction or turning, and wherein slides are displaceable along the logistics gantries, the slides being adapted for lifting or placing of parts for moving the parts in Z-direction.

Sufficient buffer capacity is provided by storage devices that are, preferably, located at crossing points formed between the logistics gantries and the handling gantries.

Contrary to systems that are linked via conveyor belts, the linkage of the total system in the direction of the main parts flow as well as in transverse direction thereto via gantries, allows for a fast exchange of parts between different processing stations, so that in case of breakdown of individual processing stations the respective processing operations can be performed by other processing stations, without any noticeable influence on the efficiency of the total system. In this way parallel capacities can be provided in the direction of the parts flow as well as transversely thereto, thereby allowing an effective utilization. Also so-called linkage losses are avoided which emerge in prior art systems when different processing stations are linked by different devices. Due to the fact that the logistics gantries must have only slides which allow moving of parts in Z-direction and which allow a gripping operation for picking up or placing of parts, the total cost of the manufacturing system is reduced remarkably.

Necessary additional handling operations can be performed by the handling gantries in combination with the storage devices, since the handling gantries may carry slides with more complicated handling devices. The slides on the handling gantries allow at least a displacing in vertical direction and an additional handling operation, such as a displacing in Y-direction or a turning about one or more axes, as well as a gripping operation. Thereby more complex handling operations can be performed by the handling gantries, while simple transport of parts for loading and unloading individual processing stations and also buffering of parts in the storage devices can be performed by logistics gantries which are designed more simple and cost effective.

In an advantageous further development of the invention a plurality of handling gantries and logistics gantries are configured crossing each other at crossing points, wherein a storage device is assigned to each crossing point.

Due to this measure an additional redundancy is introduced into the manufacturing system, since in the direction of the main parts flow as well as transversely thereto a linked total system is achieved which is designed as a net-like structure having storage devices at the network crossing points, thereby providing very high flexibility.

Such a system provides for a very simple design while having a high flexibility and an extremely effective utilization of the total space covered by the manufacturing system at the same time.

According to a further advantageous development of the invention in the storage devices additional devices such as cleaning devices, positioning devices, blowing devices, washing devices, marking devices etc. are provided, which cooperate with the gripping devices on the slides of the handling gantries for performing handling operations.

In this way additional handling cells for performing such handling operations can be avoided. Supplementary transport devices within such handling devices, necessary in prior art systems, become superfluous, since the transport functions can be performed by the gripping devices provided on the slides of the handling gantries. The gripping devices provided on the slides of the handling gantries can also cooperate with supplementary devices at the same time, so that additional supplementary transport means necessary in prior art handling devices can be avoided to a large extent.

According to an advantageous improvement of the invention the slides and gripping devices displaceable on the logistics gantries are adapted only for displacing parts along the logistics gantries, for moving parts vertically and for transferring parts.

Thereby the logistics gantries are designed solely for transferring parts between processing stations, for vertical displacement and for picking up and placing of parts, whereby on the one hand cost is reduced remarkably, and on the other hand drive systems can be utilized which are particularly tailored and which allow for a high conveying velocity and availability.

According to an improvement of this design on at least one logistics gantry a plurality of controllably displaceable slides is arranged, at least two adjacent ones of which are linked via braces with an articulated joint, whereon a gripping device is received.

Thereby a particularly fast transportation of parts in horizontal direction as well as in vertical direction is made possible in a cost-effective way.

A particularly fast displacement is achieved while reducing masses at the same time, when the slides are configured as travelers of a direct drive, the inductor rail of which being provided at the logistics gantry.

In this design the logistics gantry must only have a horizontal brace that carries the inductor rail which is configured at the same time as a guidance along which the slides are guided.

In this way an extremely fast transportation velocity of parts is reached in combination with a simplified design.

In addition, such logistics gantries can be provided with a drip pan for collecting fluids, to avoid the spreading of coolant during transportation between individual processing stations and storage devices. Herein the logistics gantries are preferably supported on vertical bracings from below, or are held from above on a suitable ceiling structure, so that the transportation of parts along the logistics gantries practically does not impart any other room within the manufacturing system, so that the respective processing stations can be loaded and unloaded from above.

By the particular construction of the logistics gantry utilized the necessary design height is reduced remarkably, since additional guides in vertical direction are completely superfluous.

According to a further variation of the invention the logistics gantries are divided into a plurality of single sections each ending in a storage device, wherein in each storage device a transfer means is provided for transferring parts between the respective end sections of the single sections of a logistics gantry.

This design has the advantage that the transportation steps between the handling gantries and the logistics gantries are decoupled from each other, so that no particular measures must be taken for avoiding collisions. Herein the transport means within the storage devices provide for a free transport of parts along the logistics gantries. Also there is a possibility to arrange the logistics gantries and the handling gantries roughly on the same operating height, so that unnecessary large vertical movements at the logistics gantries and at the handling gantries can be avoided.

In an advantageous improvement of this design between the respective end sections of a logistics gantry within the storage device a slider is provided for transferring parts.

Thereby transportation is effected between the end sections in a particularly simple way.

Needless to say, the features of the invention mentioned before and to be explained hereinafter can be utilized not only in the given combination but also in other combinations or alone, without exceeding the teachings of the invention.

BRIEF DESCRIPTION OF THE DRAWINGS

Additional features and advantages of the invention may be taken from the subsequent description of preferred embodiments of the invention with reference to the drawings. In the drawings show:

FIG. 1 a portion of a linked manufacturing system according to the invention, in simplified schematic representation;

FIG. 2 an enlarged representation of a storage device according to FIG. 1 in schematic representation, wherein only a plurality of storage places for single parts are indicated;

FIG. 6 a section of the manufacturing system in a design modified with respect to FIG. 1.

DETAILED DESCRIPTION OF THE PREFERRED EMBODIMENTS

Figure 3:
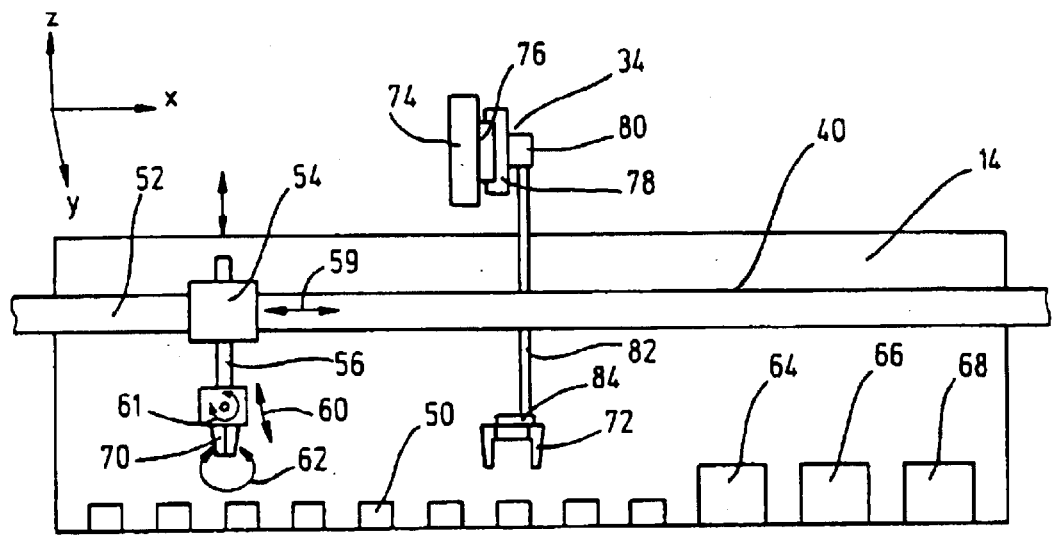
FIG. 3 a longitudinal view of a storage device that may be configured as a closed cell and through which a handling gantry extends, wherein also a logistics gantry extending transversely thereto is indicated.

In FIG. 1 a linked manufacturing system according to the invention is shown very schematically and depicted in total with reference numeral 10.

The manufacturing system 10 comprises six processing stations $S_{11}$, $S_{12}$, $S_{13}$, $S_{14}$, $S_{15}$, $S_{16}$ which perform first processing operations, six processing stations $S_{21}$, $S_{22}$, $S_{23}$, $S_{24}$, $S_{25}$, $S_{26}$ which perform a second, subsequent processing operation, as well as nine processing stations $S_{31}$, $S_{32}$ $S_{33}$, $S_{34}$, $S_{35}$, $S_{36}$, $S_{37}$, $S_{38}$, $S_{39}$ which perform third, subsequent processing operations.

A first gantry 32 extending in the direction of the main parts flow (Y-direction) (in the following referred to as logistics gantry) links a first storage device 12 in which a plurality of parts may be stored, with three processing stations $S_{11}$, $S_{12}$, $S_{13}$ which perform a first processing operation, with a storage device 16, further with three subsequent processing stations $S_{21}$, $S_{22}$, $S_{23}$ which perform second processing operations, further with a storage device 20, further with three processing stations $S_{31}$, $S_{32}$, $S_{33}$ which perform third processing operations, and finally with a storage device 24 arranged subsequently.

An additional logistics gantry 34 extending in parallel to logistics gantry 32, links an additional storage device 14 with three processing stations $S_{14}$, $S_{15}$, $S_{16}$ which perform first processing operations, with an additional storage device 18, further with three processing stations $S_{24}$, $S_{25}$, $S_{26}$ which perform second processing operations, further with an additional storage device 22, further with three additional processing stations $S_{34}$, $S_{35}$, $S_{36}$ which perform third processing operations, and finally with an additional storage device 26.

A third logistics gantry 36, extending in parallel to the second logistics gantry 34, links an additional storage device 28 with three processing stations $S_{37}$, $S_{38}$, $S_{39}$ which perform third processing operations, and finally with an additional storage device 30.

The two storage devices 12, 14, which are each coupled via the logistics gantries 32, 34 with three processing stations $S_{11}$, $S_{12}$, $S_{13}$, or $S_{14}$, $S_{15}$, $S_{16}$ for the first processing operation, respectively, are linked to each other by a second gantry 40 extending transversely to the logistics gantries 32, 34 in X-direction and designated in the following as a handling gantry.

Correspondingly also the subsequent storage devices 16, 18, or 20, 22, or 24, 26, respectively, are each linked by another handling gantry 42 or 44 or 46, respectively. The handling gantry which links the storage device 20 and the storage device 22 is further extended to the storage device 28, so that three crossing points 21, 23, 25 of the handling gantry 44 with the logistics gantry 32, 34, 36 result, at each of which a storage device 20, 22, 28 being provided.

Similarly the storage devices 24, 26 and 30 are linked via the handling gantry 46, so that the handling gantry 46 forms three crossing points 27, 29, 33 with the logistics gantries 32, 34, 36, a storage device 24, 26, 30 being provided at each crossing point.

For charging the storage devices 12, 14 or the processing stations $S_{11}$ to $S_{16}$, respectively, another logistics gantry 38 may be provided for the first operating operation, as indicated in FIG. 1.

Also for further transport of parts from the storage devices 24, 26, 30 or the operating stations $S_{31}$ to $S_{39}$, respectively, for the third operating operation to a subsequent station of the manufacturing system, an additional logistics gantry 39 is provided which may for instance be coupled to the storage device 26 and forms a further crossing point 31 with handling gantry 46.

In a corresponding manner the logistics gantry 38 may be coupled to the first storage device 12, so that at the first storage device 12 a further crossing point 11 with the handling gantry 40 is formed.

Needless to say, the loading at storage devices 12 or 14, respectively, at the entry of the manufacturing system, and the unloading at the outlet of the manufacturing system at storage devices 24, 26, 30 can also be performed in a different manner.

The processing stations $S_{11}$ to $S_{16}$ for the first processing operation are linked redundantly in Y-direction as well as in X-direction by the two logistics gantries 32, 34 and the storage devices 12, 14, 16, 18 which are each provided at the crossing points 13, 15, 17, 19 with the handling gantries 40, 42.

Also the processing stations $S_{21}$ to $S_{26}$ for the second processing operation are linked redundantly in Y-direction as well as in X-direction via the logistics gantries 32, 34, at the crossing points 17, 19, 21, 23 of which with the handling gantries 42, 44 the storage devices 16, 18, 20, 22 are provided.

Finally, also the processing stations $S_{31}$ to $S_{39}$ for the third processing operation are linked redundantly in Y-direction as well as in X-direction via the logistics gantries 32, 34, 36, at the crossing points 21, 23, 25, 27, 29, 33 of which with the handling gantries 44, 46 the storage devices 20, 22, 28, 24, 26, 30 are provided.

In combination in this way a net-like structure is formed which ensures that delays resulting from a breakdown of individual processing stations from the piling up of parts at individual gantries may be bypassed on a different route. In this way the manufacturing system 10 allows the utmost flexibility while requiring small space and allowing fast throughput times.

Basically, it is of course possible, to provide the storage devices 12, 14, 18, 20, 22, 24, 26, 28, 30 with their own transport or handling systems, respectively.

To keep the design and the functioning of the manufacturing system 10 as simple as possible, however, it is preferred that necessary handling operations, such as positioning, aligning, turning about a first axis or about a second axis, displacing within the storage device in X-direction or in Y-direction can be performed by means of the handling gantries 40, 42, 44, 46.

As explained in an exemplary manner with respect to FIG. 2, below a logistics gantry 34 for instance three storage positions 48 could be provided, which may be accessed by a slide displaceable on a logistics gantry 34. Adjacently, further storage places 48 are shown below the handling gantry 40 as well as collateral thereto, which may be accessed by a slide displaceable thereon, wherein at the same time by an additional displacement possibility in Y-direction it is ensured that all storage places 48 within storage device 14 can be accessed from the handling gantry 40.

This will be explained in the following with respect to FIG. 3 which shows the storage device 14.

Storage device 14 is preferably enclosed by a safety fence that only at its respective end faces is provided with throughput openings for the slide 54 which is displaceable along a guidance 52 on the handling gantry 40, as denoted by arrow 59. By contrast, the logistics gantry 34 may extend roughly above the storage device 14 and may take parts 50 from storage device 14, or may place same therein from above, only if needed.

At slide 54 which is displaceable along guidance 52 of handling gantry 40 in the direction of the double arrow 59, either a guidance 56 is provided in vertical direction, upon which a gripping means 70 is held displaceably in vertical direction. Or a pivot arm (not shown) is provided which is controllably pivotable about a pivot axis extending (in Y-direction) transversely to the direction 59 in which the handling gantry 40 extends. In the design shown, the gripping means 70 can also be turned (see double arrow 62) about a vertical axis (Z-axis), about an additional turning axis extending perpendicularly thereto, and can finally be displaced in a direction perpendicularly to the direction of extension 59 (also in Y-direction), such as indicated by double arrow 60. In total, the gripping means 70 can thus be displaced in three linear axes (X, Y, Z) and, in addition, can be pivoted about two pivot axes perpendicularly to each other. Thus, by means of the gripping means 70 parts 50 may be picked up from any places within storage device 14 or placed thereon and, in addition, can be pivoted about two axes.

By way of example, in FIG. 3 three supplementary devices are indicated with numerals 64, 66, 68, which may for instance be a washing device, a blowing device and a marking device. These supplementary devices 64, 66, 68 may also be accessed by means of the gripping means 70, without requiring any additional displacement device within each supplementary device 64, 66, 68.

By contrast, the logistics gantries extending in Y-direction allow only a displacement of parts 50 along the logistics gantries in Y-direction, as well as a movement of the parts in vertical direction (Z-direction) and a picking up or placing, respectively, by means of the gripping means 72.

Figure 4:
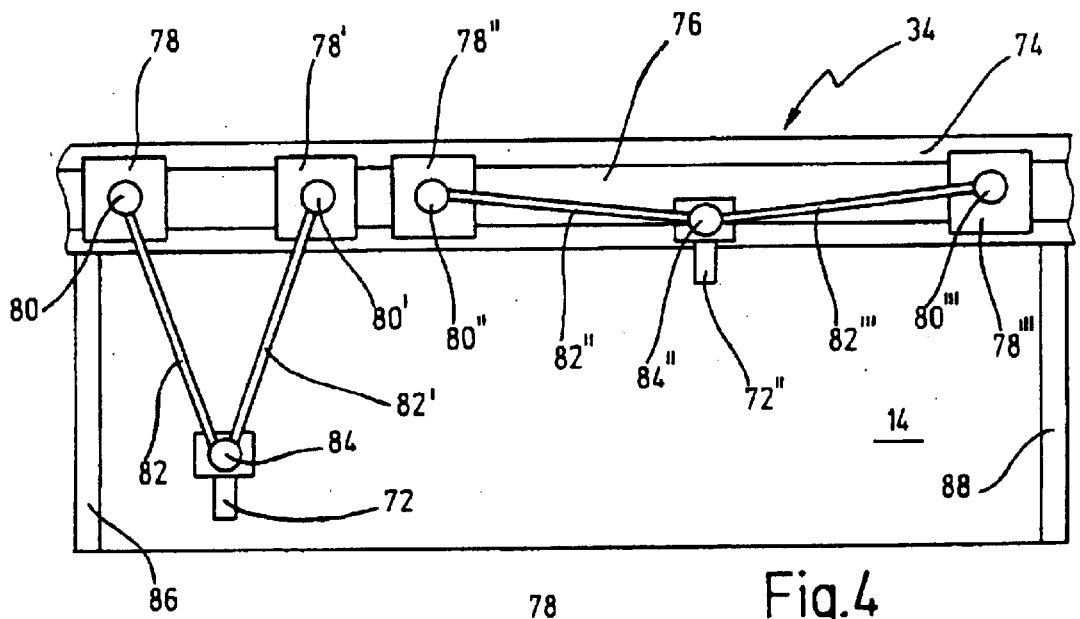
FIG. 4 a longitudinal view of a logistics gantry in schematic representation.

As can be seen from FIG. 4 in more detail, herein two adjacent slides 78, 78' or 78", 78''', respectively, are each linked by an articulated joint 80, 80' or 80", 80''', respectively, and by two torsion-resistant struts 82, 82' or 82", 82''', respectively, with another articulated joint 84 or 84', respectively, at which the gripping means 72 or 72", respectively, is supported.

By displacing the slides 78, 78' or 78", 78''', respectively, along horizontal guidance 76 of the logistics gantry 34, in this way parts 50 can be displaced in the direction of extension (Y-direction) of the logistics gantries, and can simultaneously be lifted or lowered in vertical direction (Z-direction), in case the distance between two adjacent slides is varied.

The respective logistics gantry 34 thus only has a horizontal beam 74 which is supported by a vertical bracing of any kind, such as shown in an exemplary manner by struts 86 and 88. Along the logistics gantry a plurality of slide pairs can be displaced which each are linked by a coupling articulated joint.

Figure 5:
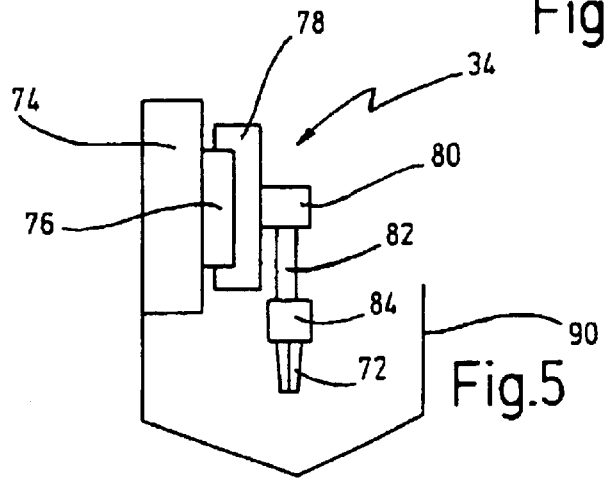
FIG. 5 an enlarged view of an end face of a logistics gantry in the region of the horizontal beam carrying a drip pan, in simplified representation.

A particularly simple design together with an extremely fast displacement possibility having only small masses to be moved is reached by the fact that the slides 78, 78', 78", 78''' are configured as travelers of a direct drive, the inductor rail 76 of which is supported by the horizontal beam 74, wherein the inductor rail is configured as a horizontal guidance simultaneously (cf. FIG. 5).

These logistics gantries may extend at sufficient height above the processing stations $S_{11}$ to $S_{39}$, to allow a feeding and a removing of parts into and out of the processing stations from above.

Along the region, wherein only a transport of parts along the direction in which the logistics gantries extend, the logistics gantries may preferably be provided with a drip pan 90 for collecting coolant dripping from the parts.

In FIG. 6 a different embodiment of the manufacturing system of FIG. 1 is shown and designated in total with numeral 10'. FIG. 6 only shows a smaller section from the manufacturing system having four operating stations $S_{13}$, $S_{16}$, $S_{21}$ and $S_{24}$. Both processing stations $S_{13}$ and $S_{16}$ may, for instance, be designed for performing a first processing operation like the manufacturing system of FIG. 1, while the two processing stations $S_{21}$ and $S_{24}$ may be designed for a subsequent processing operation.

The two processing stations $S_{13}$ and $S_{21}$ are supplied with parts by a logistics gantry 32'. The two processing stations $S_{16}$ and $S_{24}$ are supplied with parts by a logistics gantry 34'.

By contrast to the design shown in FIG. 1, the two logistics gantries are not designed continuously, but are sectioned into a plurality of single or individual sections which each end in a storage device. Thus the logistics gantry 32' comprises a partial section 32a, which ends in the storage device 16' with an end section 32c, and further comprises a partial section 32b which ends with an end section 32d in the storage device 16' opposite the other end section 32c.

In a corresponding manner also the logistics gantry 34' comprises a single section 34a which ends with an end section 34c in storage device 18', as well as an additional single section 34b which ends with an end section 34d in storage device 18' opposite the other end section 34c.

Needless to say, the logistics gantries 32', 34' may end in a corresponding manner each with end sections in storage devices and may be sectioned in additional individual sections, depending on the size of the total system.

The two storage devices 16', 18' are linked by the handling gantry 42, like in the design according to FIG. 1.

For transferring parts between the respective end sections 32c, 32d of logistics gantry 32', or 34c, 34d of logistics gantry 34', respectively, a slider device 92 or 94, respectively, is provided.

According to FIG. 6 the slider device 92 within storage device 16' is shown in its left position suitable for receiving a part from a gripping means that is supported by a slide supported on end section 32c, as well for receiving an additional part below handling gantry 42. The slider device 92 can be displaced in the direction of arrow 93 to the right into the position shown in dashed lines, so that a part picked up at the beginning at the left end of the slider is below the handling gantry 42, and a part that previously had been at the right side of slider device 92, can now be picked up at the end section 32d by a gripping means, to supply processing station $S_{21}$ therewith, for instance. Subsequently, slider device 92 may again be displaced into its initial position.

In a corresponding manner the slider device 94 within storage device 18' may be displaced from its position at the right side which is shown unbroken, in direction of arrow 95 into the position at the left side which is shown dashed, and may subsequently be displaced backwardly, whereby again, preferably, two parts are moved simultaneously.

The construction of the slider devices 92, 94 is not shown in detail, since it may be of conventional design comprising a moving part for receiving parts, that is displaceable between two end positions along a guidance by some kind of drive means, such as a belt drive or a hydraulic cylinder.

All other handling operations are performed on the parts by the slides displaceable along handling gantry 42, or by gripping means supported thereon, respectively. This may include a pivoting of parts, a cleaning of parts, a marking of parts, a placing or picking up of parts, respectively, on storage places 48 which are shown only schematically in FIG. 6. Preferably, in this design the respective handling gantry 42 is provided with a pivot arm, upon which the respective gripping means is supported in a suitable manner pivotably and/or displaceably. By the utilization of pivot arms which may be controllably pivoted, the design height in vertical direction is reduced, since a Z-axis can be avoided and vertical movements as well as movements between opposite storage places 48 can be performed by a pivot arm which comprises at least two pivot levers coupled with each other.

Needless to say, the number of the slides displaceable along the logistics gantries and along the handling gantries can be selected depending on the respective requirements of the manufacturing system in a suitable way.

Also it should be noted that the representations shown in the Figures of the drawing are merely schematic and may not be drawn to scale.

What is claimed is:

1. A linked manufacturing system for processing parts, comprising:
    a plurality of first gantries extending in a first direction and being arranged parallel to each other;
    a plurality of second gantries extending transversely to said first direction in a second direction and being arranged parallel to each other, said first and second gantries forming crossing points with each other;
    a plurality of first processing stations for performing a first processing operation;
    a plurality of second processing stations for performing a second processing operation;
    a plurality of storage devices being arranged at said crossing points, each storage device comprising a plurality of storage places for receiving parts;
    a plurality of first slides arranged displaceably along said first gantries;
    a plurality of second slides arranged displaceably along said second gantries;
    a plurality of first gripping devices supported by said first slides and comprising means for gripping and for vertically displacing parts;
    a plurality of second gripping devices arranged displaceably in vertical direction on said second slides and comprising means for gripping parts and means for moving parts in at least one more direction different from said vertical direction;
    wherein said first and second processing stations are linked by said first gantries, and said first gripping devices are configured for transferring parts between said storage devices and said first or second processing stations; and
    wherein said second gripping devices are configured for transferring parts between the storage places of the storage devices linked by the second gantries.

2. The manufacturing system of claim 1, wherein at least one of said storage devices comprises a supplementary handling device cooperating with one of said second gripping devices for performing handling operations.

3. The manufacturing system of claim 2, wherein said supplementary handling device is one of the group formed by a cleaning device, a positioning device, a blowing device, a washing device and a marking device.

4. The manufacturing system of claim 1, wherein said first slides are controllably displaceable along said first gantries, and wherein at least two adjacent ones of said first slides are linked via braces with an articulated joint, which supports a first gripping device.

5. The manufacturing system of claim 4, wherein at least one of said first gantries comprises a direct drive having an inductor rail and a traveller driven thereon.

6. The manufacturing system of claim 5, wherein at least one of said first gantries comprises a horizontal beam on which the inductor rail and a guidance are supported for guiding the traveller.

7. The manufacturing system of claim 5, further comprising a drip pan for collecting liquids being supported below one of said first gantries.

8. The manufacturing system of claim 1, wherein at least one of said first gantries is sectioned into a plurality of individual gantry sections, each gantry section having an end section ending in a storage device.

9. The manufacturing system of claim 8, further comprising a transfer means linking said end sections of said first gantry for transferring parts within said storage device between opposing end sections of said first gantry.

10. The manufacturing system of claim 9, wherein said transfer means is configured as a slider device comprising a support for receiving parts and being movable between two end positions for transferring parts between opposing end sections of said first gantry.

11. A linked manufacturing system for processing parts, comprising:
    a plurality of first processing stations for performing a first processing operation;
    a plurality of second processing stations for performing a second processing operation;
    at least a first gantry extending in a first direction and linking at least one of said first and one of said second processing stations;
    at least a second gantry extending transversely to said first direction in a second direction, said second gantry forming a crossing point with said first gantry;
    at least two storage devices comprising a plurality of storage places for receiving parts and being linked by said second gantry, one of said storage devices being arranged at said crossing point;
    a plurality of first slides arranged displaceably along said first gantry;
    at least one second slide arranged displaceably along said second gantry;
    at least one first gripping device supported by at least one of said plurality of first slides and comprising means for gripping a part and for vertically displacing said part;
    at least one second gripping device arranged displaceably in vertical direction on said second slide and comprising means for gripping a part and means for moving said part in at least one more direction different from said vertical direction;
    wherein said first gripping device is configured for transferring parts between any storage place of one of said storage devices and one of said first operating stations; and
    wherein said second gripping device is configured for transferring parts between any storage places of said storage devices.

12. The manufacturing system of claim 11, further comprising a plurality of first gantries extending parallel to each other, and further comprising a plurality of second gantries extending parallel to each other, said first and second gantries crossing each other at crossing points, a storage device being arranged at each crossing point.

13. The manufacturing system of claim 11, wherein at least one of said storage devices comprises a supplementary handling device cooperating with one of said second gripping devices for performing handling operations.

14. The manufacturing system of claim 13, wherein said supplementary handling device is one of the group formed by a cleaning device, a positioning device, a blowing device, a washing device and a marking device.

15. The manufacturing system of claim 12, wherein at least one of said first gantries comprises a plurality of controllably displaceable first slides, at least two adjacent ones of said first slides being linked via braces with an articulated joint, which supports a first gripping device.

16. The manufacturing system of claim 15, wherein at least one of said first gantries comprises a direct drive having an inductor rail and a traveller driven thereon.

17. The manufacturing system of claim 16, wherein at least one of said first gantries comprises a horizontal beam on which the inductor rail and a guidance are supported for guiding the traveller.

18. The manufacturing system of claim 16, further comprising a drip pan for collecting liquids being supported below one of said first gantries.

19. The manufacturing system of claim 3, wherein at least one of said first gantries is sectioned into a plurality of individual gantry sections, each gantry section having an end section ending in a storage device.

20. The manufacturing system of claim 19, further comprising a transfer means linking said end sections of said first gantry for transferring parts within said storage device between opposing end sections of said first gantry.

21. The manufacturing system of claim 20, wherein said transfer means is configured as a slider device comprising a support for receiving parts and being movable between two end positions for transferring parts between opposing end sections of said first gantry.

22. A manufacturing system comprising a plurality of processing stations and a gantry for moving parts in horizontal and vertical direction between said processing stations, said gantry comprising a horizontal guidance, and further comprising a plurality of slides arranged controllably displaceably along said guidance, wherein at least two adjacent slides are linked via struts to an articulated joint, a gripping device for handling a part being supported on said articulated joint wherein the slides are configured as travellers of a direct drive, the direct drive having an inductor rail which is supported on said gantry.

23. The manufacturing system of claim 22, wherein the gantry comprises a horizontal beam supporting the inductor rail and a guidance for guiding the slides thereon.

24. The manufacturing system of claim 22, further comprising a drip pan for collecting liquids which is supported below at least a part of said gantry.

* * * * *